United States Patent [19]

Neeley

[11] Patent Number: 4,905,376
[45] Date of Patent: Mar. 6, 1990

[54] APPARATUS FOR FACILITATING TRAILER HITCH ELEMENT ALIGNMENT

[76] Inventor: Rodger P. Neeley, Rte. 3, Box 361K, DeQueen, Ark. 71832

[21] Appl. No.: 261,086

[22] Filed: Oct. 24, 1988

[51] Int. Cl.$^4$ ............................................. G02B 5/06
[52] U.S. Cl. ..................................... 33/264; 280/477; 350/624
[58] Field of Search .......................... 33/264; 280/477; 350/604, 606, 632, 624; 116/28

[56] References Cited

U.S. PATENT DOCUMENTS

| | | | |
|---|---|---|---|
| 1,671,315 | 5/1928 | Pruitt | 350/632 |
| 1,918,802 | 7/1933 | Fleischer | 350/624 |
| 2,815,732 | 12/1957 | Majors . | |
| 3,295,914 | 1/1967 | Dietrich . | |
| 3,332,731 | 7/1967 | Penk . | |
| 3,524,701 | 8/1970 | Strohmeier . | |
| 3,858,966 | 1/1975 | Lowell, Jr. . | |
| 4,163,606 | 8/1979 | Granno . | |
| 4,192,526 | 3/1980 | Myers . | |
| 4,666,176 | 5/1987 | Sand . | |
| 4,702,572 | 10/1987 | Cossey . | |

Primary Examiner—Harry N. Haroian
Attorney, Agent, or Firm—Hill, Van Santen, Steadman & Simpson

[57] ABSTRACT

A hitch viewing mirror assembly detachably mounts directly to the tow vehicle, either a special tail-gate clamping means for a pick-up truck or a magnetic mount for a passenger car, thus the tow view operator may view the two vehicle hitch member and the trailer hitch member while operating the tow vehicle during the coupling process thereby providing a particularly effective method of aligning the position of the hitch members.

6 Claims, 2 Drawing Sheets

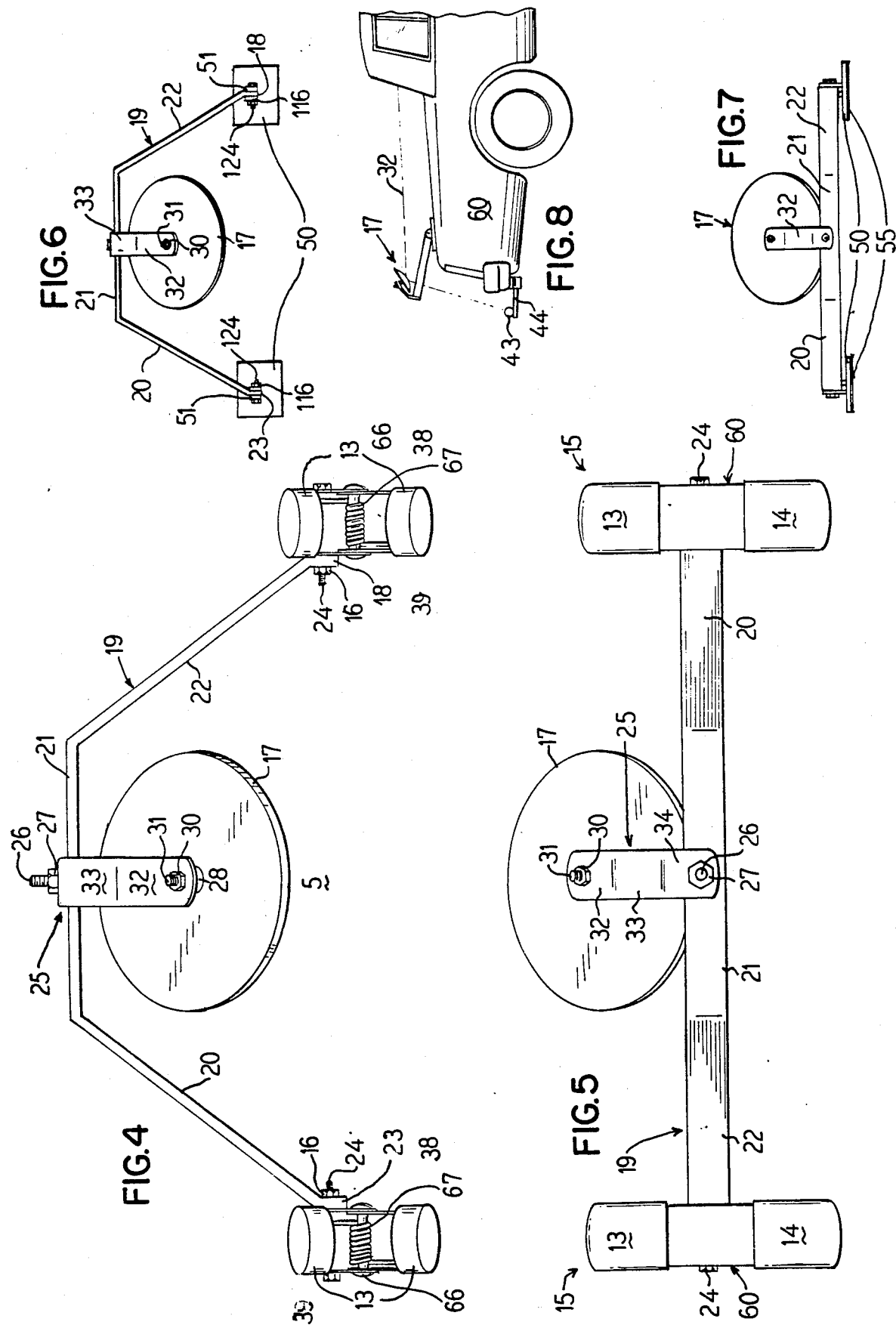

APPARATUS FOR FACILITATING TRAILER HITCH ELEMENT ALIGNMENT

BACKGROUND OF THE INVENTION

1. Field of the Invention

The present invention relates to a trailer hitch guide mirror for facilitating the positioning of a tow vehicle hitch member in proper alignment with the corresponding member located on the trailer during the coupling of the vehicle and trailer.

2. Description of the Prior Art

A variety of hitches are available for connecting a trailer to a tow vehicle. Most of these hitches consist of a hitch member rigidly secured to the lower portion of the tow vehicle and a mating hitch member rigidly secured to the lower portion of the trailer.

Since such hitch members are affixed to the lower portions of their respective vehicles, the person operating the tow vehicle may find it difficult, if not impossible, to view the hitch members during the alignment process. Consequently, the tow vehicle operator must often make numerous coupling attempts before the trailer and tow vehicle are properly aligned for coupling. As such, it is advantageous for the tow vehicle operator to view the hitch members during the alignment process thereby making the coupling process more efficient.

Several devices have been suggested in the prior art which allow the tow vehicle operator to view the hitch members during the alignment process. For example, U.S. Pat. No. 4,163,606 to Granno shows a mirror assembly in which the mirror is secured to a trailer and adjusted to allow the operator of the tow vehicle to clearly view the hitch member affixed to the trailer. The viewing position of the mirror is adjustable through the use of telescoping members which horizontally and vertically displace the mirror from the trailer. Such telescoping members are secured to the trailer using mounting means which mount to the gas tanks located on the trailer. Other such devices are known in the prior art (see, for example, U.S. Pat. Nos. to Dietrich 3,295,914, Penk 3,332,731, Strohmeier 3,524,701, and Lowell, Jr. 3,858,966). However, all such devices heretofore known in the art address the unique problems inherent in mounting the mirror to the trailer.

SUMMARY OF THE INVENTION

The present invention provides a detachable hitch viewing mirror which mounts to the tow vehicle thereby allowing the tow vehicle operator to visually align the tow hitch members during the coupling process.

The convex mirror is attached to structured members which vertically and horizontally displace the mirror from the tow vehicle thereby placing the mirror in a position such that the tow vehicle operator may view the tow vehicle hitch members either by viewing the mirror directly as when engaging in a backing maneuver or through either the interior rear view mirror or exterior rear view mirror. Such structured members are secured to the tow vehicle, for example, a pick-up truck, with a specifically adapted tail-gate mounting means. Alternatively, the tow vehicle may be a car with magnetic mounting means.

BRIEF DESCRIPTION OF THE DRAWINGS

FIG. 4 is a top plan view of FIG. 3.

FIG. 5 is a rear elevation view of the present device.

FIG. 6 is a top plan view of another embodiment of the present invention utilizing magnetic members to detachably mount the device to a car.

FIG. 7 is a side elevation view of the device shown in FIG. 6.

FIG. 8 shows a side elevation view of a tow vehicle, in this instance, a car, having an embodiment of the present device shown in FIG. 6 and FIG. 7 operatively applied thereto.

DESCRIPTION OF THE PREFERRED EMBODIMENTS

Figure 1:
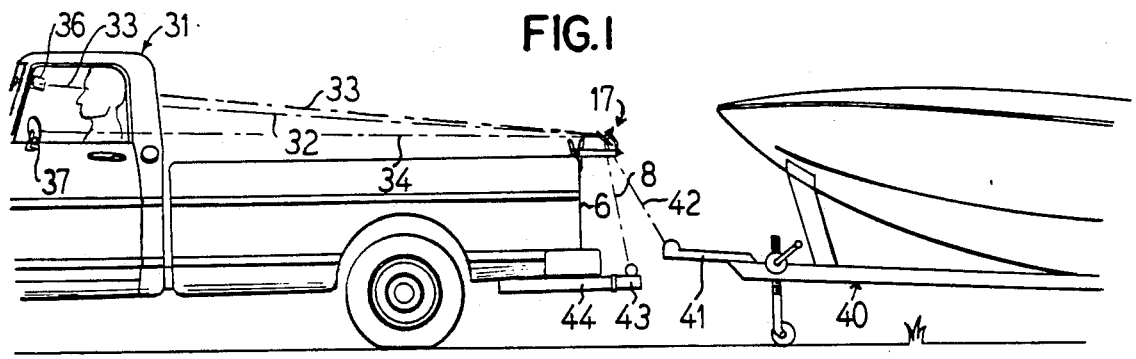
FIG. 1 is a side elevation of a tow vehicle and trailer showing the present device operatively applied to the tow vehicle, in this instance, a pick-up truck.

A convex mirror is shown generally at 17 and may be attached to a mirror connecting member 29 such that the position of the mirror 17 with respect to the mirror connecting member 29 may be adjusted by utilizing a ball and socket joint 28.

The mirror 17 is fastened to a vertical displacement bar 25 by screwing a nut 30 to the mirror connecting member 29 having a threaded section 31 on the end located opposite to the mirror 17. The vertical displacement bar 25, in turn, is fastened to a horizontal displacement bar 19 by a bolt 27 placed through the transverse section 21 of the horizontal displacement bar 19 and the securing section 34 of the vertical displacement bar 25.

The vertical displacement bar 25 and the horizontal displacement bar 19 provide the primary means for locating the mirror 17 at an elevation above the tow vehicle hitch member 43. The ball and socket joint 28 located at the junction of the mirror 17 and the mirror connecting bar 29 is used to precisely align the mirror 17 within the field of view of the tow vehicle operator 3, 4 or in alignment with the interior and/or exterior rear view mirrors 36, 37 of a tow vehicle.

The horizontal displacement bar 19 is shown formed into a modified U-shape comprised of five sections. The fastener mounting sections 18, 23 are located at the ends of the horizontal displacement bar 19. Such fastener mounting sections 18, 23 are parallel to one another. Angular sections 20 and 22 proceed from the fastener mounting sections 23 and 18 respectively. The angular sections 20, 22 proceed toward each other from the fastener mounting sections 23, 18 and are the principal sections associated with the horizontal displacement of the horizontal displacement bar 19.

A transverse section or bight portion 21 connects the angular sections 20, 22 and is generally parallel to the rear section of the tow vehicle 6 and normal to the sections 18 and 23. The vertical displacement bar 25 is secured to the transverse section 21 of the horizontal displacement bar 19.

The vertical displacement bar 25 accommodates both vertical and horizontal displacement of the mirror 17 and is comprised of three sections. The vertical/horizontal joining section 34 of the vertical displacement bar 25 proceeds from the horizontal displacement bar 19 in a purely vertical fashion. The transverse section of the vertical displacement bar 33 proceeds from the vertical/horizontal joining section 34 at an angle. Similarly, the mirror/vertical displacement bar joining section 32 proceeds from the transverse section 33 in an angular fashion.

In addition to providing further vertical displacement, the vertical displacement bar 25 also has a horizontal displacement in the direction opposite to that provided by the horizontal displacement bar 19. Such horizontal displacement allows the mirror 17 to be located in the unobstructed region 5 above the tow hitch member 43 which is created by the horizontal displacement bar 19.

Figure 2:
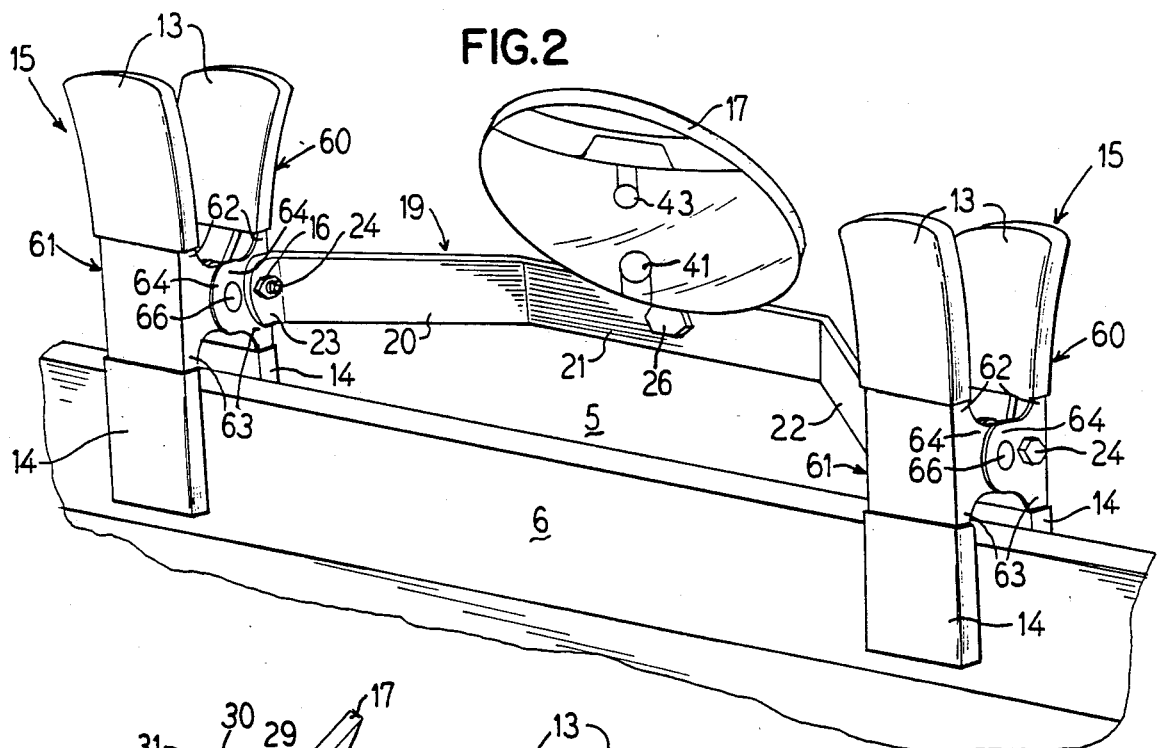
FIG. 2 is an enlarged perspective view of the rear of the pick-up truck with the present device attached thereto.
Figure 3:
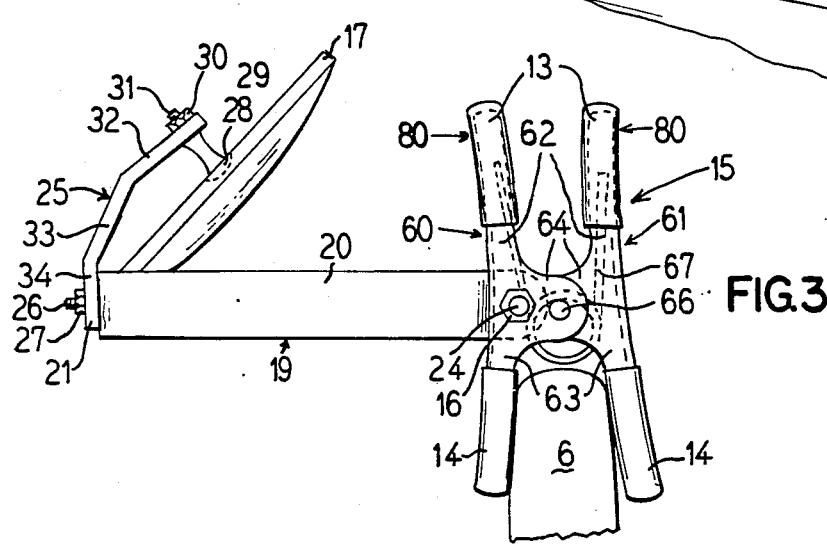
FIG. 3 is a side elevation view of the present device.

In the form of the invention shown in FIGS. 2, 3 and 4, the bar 19 is secured to the tail-gate of a tow vehicle by specially adapted spring clamps secured to respective fastener mounting sections 18, 23 of the horizontal displacement bar 19 by a pair of bolts 24, 24 and a pair of lock nuts 16, 16.

The spring clamps may have hand grips 13 to provide the user with a comfortable means for grasping the spring clamps 15 while the operator secures the device to the tow vehicle. Additionally, the spring clamps 15 may be provided with protective coatings 14 made of rubber, vinyl or some suitable cushioning materials to assist in preventing the spring clamps 15 from scratching the paint on the tow vehicle 1 when the device 7 is secured.

Each spring clamp 15 comprises two clamping elements 60, 61 having an upwardly extending section 62, a downwardly extending section 63, and pivotal connection sections 64, 64 extending perpendicularly from the upwardly and downwardly extending sections 62, 63. The pivotal connection sections 64, 64 are parallel to one another and are spaced so as to allow the pivotal components of clamping element 60 to overlap the corresponding pivotal connection components of clamping element 61. A pivot rod 66 is placed through the overlapping pivotal connection sections 64, 64 to fasten the clamping elements 60, 61 thereby providing means to displace the clamping components pivotally about the pivot rod 66. A bolt 24 is placed through the pivotal connection sections 64, 64 of clamping element 60 and a nut 16 is threaded thereto for securing the spring clamp 15 to the connecting sections of the horizontal displacement bar 23, 23.

A torsion spring 67 is located about the pivot rod 66 such that the lower extensions 63, 63 of the respective clamping elements 60, 61 are normally forced together by the action of the torsion spring 67. When the user applies compressive forces in the direction of the arrows 80, 80 shown on FIG. 3, the downward extensions 63, 63 separate thereby allowing application to the rear portion of the tow vehicle 6. Upon removal of the compressive forces 80, 80, the torsion spring 67 supplies the force necessary to cause the lower extensions 63, 63 to grasp the rear portion of the tow vehicle 6.

In operation, as shown in FIG. 1, the mirror 17 is detachably mounted to the rear section 6 of a tow vehicle 31. The mirror 17 is adjusted, for example, by the ball and socket joint 28, to provide the tow vehicle operator with a clear view of the tow vehicle hitch member 43. Such a clear view of the tow vehicle hitch member may be achieved via a direct line of vision shown by lines 32 and 33 or 34. The site access 32 represents the direct line of site when the driver is engaged in a backing maneuver and physically turns his head. Alternatively, using an interior rear view mirror 36, a clear view of the tow hitch member 10 may be achieved via the line of vision shown by the site line 33. The user may also use the exterior mirror 37 on which there is achieved a site line 34.

A tow vehicle operator moves the tow vehicle 31 towards a trailer 40 placing a trailer hitch member 41 in view of the tow vehicle operator as shown by site line 42. The tow vehicle 31 has a trailer hitch 43 mounted as at 44 to the rear underside of the vehicle. Viewing the hitch members 41, 43 in the mirror 17 the tow vehicle operator aligns the vehicles for coupling.

In FIGS. 6, 7 and 8 the means for mounting the devices to the tow vehicle is a pair of flat magnetic mounting means 50, 50 each formed with an upstanding bus 51 forming a pivot bracket to receive a threaded bolt 124 on which is threaded a locking nut 116, thereby achieving a pivotally adjustable hinged connection of the magnetic mounting means to the horizontal mounting bar 25. Like reference numerals are used to identify the like parts. The magnetic mounting means may have a protective coating 55 to prevent damage to the paint of the tow vehicle, which in this instance is a passenger vehicle 60.

Although modifications might be suggested by those skilled in the art, it should be understood that I wish to embody within the scope of the patent warranted hereon all such changes and modifications as reasonably and properly come within the scope of my contribution to the art.

I claim:

1. A device which detachably mounts to a tow vehicle for visually aligning the hitch members of a tow vehicle and trailer during the coupling process comprising:
    a convex mirror;
    a U-shaped bracket having spaced apart legs extending away from a centrally disposed bight portion and terminating in parallel free ends thereby forming an unobstructed region therebetween;
    tow vehicle mounting means respectively attached to each of said free ends of said U-shaped bracket for mounting said free ends to a tow vehicle; and
    an elongated upstanding displacement member fastened to said mirror at one end thereof in a ball and socket joint and connected at another end thereof to said centrally disposed bight portion, said elongated upstanding first displacement member providing a vertical displacement to place said convex mirroring in view of a driver of said tow vehicle and further providing a horizontal displacement to place said convex mirror in a region overlying said unobstructed region of said U-shaped bracket.

2. A device as recited in claim 1, said tow vehicle mounting means comprising spring clamps formed with hand grips and coated to prevent said spring clamps from damaging paint on said tow vehicle.

3. A device as recited in claim 1, said tow vehicle mounting means comprising spring clamps, said spring clamps comprising:
    a pair of clamping elements each having an upwardly extending section, a downwardly extending section and pivotal connection sections extending normally from said upwardly and downwardly extending sections, respective pivotal connection sections of said clamping elements overlapping for facilitating the joining of said pair of clamping elements;

a pivot rod placed through said pivotal connection sections for fastening said pair of clamping elements together and providing a means for pivotally displacing said clamping elements about an axis of said pivot rod;

a torsion spring located about said pivot rod to provide means for normally forcing the downwardly extending sections of said clamping elements together for gripping said tow vehicle.

4. A device as recited in claim 1, said tow vehicle mounting means comprising magnetic mounting members for magnetically clamping an adjoining metal surface of a tow vehicle.

5. A device as recited in claim 1, wherein said tow vehicle mounting means comprise magnetic mounting members respectively disposed on each of said free ends, said magnetic mounting members each have an upstanding boss forming a pivot bracket attached to said free ends thereby providing a pivotally adjustable hinged connection of said magnetic mounting members to said U-shaped bracket.

6. A device which detachably mounts to a tow vehicle for visually aligning hitch members of a tow vehicle and trailer during the coupling process comprising:

a convex mirror;

a horizontal displacement bracket having a first transverse centrally disposed section, angular sections and proceeding at an obtuse angle from respective ends of said transverse centrally disposed section, and end sections proceeding respectively from each of said angular section and aligned perpendicularly with respect to said transverse centrally disposed sections, said end sections forming parallel free ends having an unobstructed region therebetween;

tow vehicle mounting means respectively attached to each of said free ends of said U-shaped bracket for mounting said free ends to a tow vehicle;

an elongated upstanding displacement member fastened to said mirror at one end thereof in a ball and socket joint and connected at another end thereof to said transverse centrally disposed section, said elongated upstanding first displacement member providing a vertical displacement to place said convex mirror in view of a driver of said tow vehicle and further providing a horizontal displacement to place said convex mirror in view of a driver of said tow vehicle and further providing a horizontal displacement to place said convex mirror in a region overlying said unobstructed region of said U-shaped bracket.

* * * * *